United States Patent
Dudda et al.

(10) Patent No.: US 9,445,317 B2
(45) Date of Patent: Sep. 13, 2016

(54) INTERFERENCE-PROTECTED CONTROL MESSAGE TRANSMISSION IN A MOBILE COMMUNICATIONS NETWORK

(71) Applicant: Telefonaktiebolaget L M Ericsson (publ), Stockholm (SE)

(72) Inventors: Torsten Dudda, Aachen (DE); Michael Meyer, Aachen (DE); Elena Myhre, Järfälla (SE); Oumer Teyeb, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/430,288

(22) PCT Filed: Sep. 28, 2012

(86) PCT No.: PCT/EP2012/069224
§ 371 (c)(1),
(2) Date: Mar. 23, 2015

(87) PCT Pub. No.: WO2014/048494
PCT Pub. Date: Apr. 3, 2014

(65) Prior Publication Data
US 2015/0249938 A1    Sep. 3, 2015

(51) Int. Cl.
*H04W 36/00* (2009.01)
*H04W 72/04* (2009.01)
*H04W 88/08* (2009.01)

(52) U.S. Cl.
CPC ..... *H04W 36/0055* (2013.01); *H04W 72/0426* (2013.01); *H04W 72/0446* (2013.01); *H04W 72/0453* (2013.01); *H04W 88/08* (2013.01)

(58) Field of Classification Search
CPC .................... H04W 36/0055; H04W 72/0446; H04W 72/0426; H04W 72/0453; H04W 88/08

USPC ......................................................... 370/331
See application file for complete search history.

(56) References Cited

U.S. PATENT DOCUMENTS

2008/0232284 A1* 9/2008 Dalsgaard ........... H04W 72/042
370/310
2009/0207784 A1* 8/2009 Lee ....................... H04B 7/063
370/328

(Continued)

FOREIGN PATENT DOCUMENTS

EP      2451214 A1    5/2012
WO   2006098665 A1   9/2006

OTHER PUBLICATIONS

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.1.0, Jun. 1, 2012, pp. 1-134, 3GPP, France.

(Continued)

*Primary Examiner* — Afsar M Qureshi
(74) *Attorney, Agent, or Firm* — Coats & Bennett, PLLC

(57) ABSTRACT

For protecting transmission of a control message (60) in a mobile communications network between a first access node (10a) and a user equipment, an indication of at least one protected time-slot for transmitting the control message may be transmitted in response to a need for transmitting the control message (60). The indication is transmitted between the first access node (10a) and a second access node (10b). Transmission of the indication prompts reduction of spectral interference caused by the second access node (10b) during the at least one protected time-slot (30).

23 Claims, 11 Drawing Sheets

(56) References Cited

U.S. PATENT DOCUMENTS

2012/0157108 A1* 6/2012 Boudreau ............ H04W 16/32
                                                      455/450
2015/0023261 A1* 1/2015 Lunttila ................ H04L 1/0027
                                                      370/329
2016/0081035 A1* 3/2016 Damnjanovic ....... H04W 52/16
                                                      370/329

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.0.0, Jun. 1, 2012, pp. 1-302, 3GPP, France.

3rd Generation Partnership Project, "3rd Generation Partnership Project; Technical Specification Group Radio Access Network; Evolved Universal Terrestrial Radio Access (E-UTRA); Mobility enhancements in heterogeneous networks (Release 11)", Technical Report, 3GPP TR 36.839 V11.0.0, Sep. 1, 2012, pp. 1-53, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.2.0, Jun. 1, 2012, pp. 1-201, 3GPP, France.

Zte, "Discussion on the mobility performance enhancement for co-channel HetNet deployment", 3GPP TSG-RAN WG2 Meeting #75bis, Oct. 10, 2011, pp. 1-8, R2-114950, Zhuhai, China.

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.1.0, Jun. 1, 2012, pp. 1-652, 3GPP, France.

\* cited by examiner

INTERFERENCE-PROTECTED CONTROL MESSAGE TRANSMISSION IN A MOBILE COMMUNICATIONS NETWORK

TECHNICAL FIELD

The present application relates to a method of transmitting a control message in a mobile communications network between a first access node and a user equipment and to corresponding devices, e.g. access node.

BACKGROUND

In mobile communications networks, such as 3GPP networks (3GPP: Third Generation Partnership Project), there is a continuing need for higher data throughput. In order to achieve higher throughputs, various techniques are employed. One approach is to extensively use the limited frequency resources to obtain wide frequency bands for radio communication. This can result in a situation where two or more access nodes communicate over radio interfaces with UEs (UE: user equipment) using at least partially overlapping frequency bands.

If the two or more access nodes use at least partially overlapping frequency bands, spectral interference is likely to occur. Spectral interference can describe a situation where the radio interface between a UE and a first access node is disturbed by a radio interface of a second access node emitting power in the same frequency bands.

Spectral interference can have different effects. One possible effect is a degraded reliability of the radio interface, i.e., a higher probability for lost data packets or radio frames. This may effect the experienced communication quality in an undesired manner: voice communication may be disturbed and data communication may be delayed. In certain scenarios, even the connection between the UE and the respective access node may be lost.

A situation of spectral interference can, in particular, occur for so-called Heterogeneous Networks (HetNets). In HetNets, an access node with comparably large coverage, also referred to as macro access node, is supplemented by one or more access nodes of lower power which hence have a smaller coverage (cell size). Latter low-power access nodes are sometimes referred to as pico access nodes and can be deployed closer to the end users, e.g., on street level. Pico access nodes may be situated, preferably, in areas encountering large amounts of data traffic where there is a large demand for capacity. The pico access nodes can then reduce the load imposed on the macro access node and thereby help to increase overall throughput. Often, pico and macro nodes have at least partially overlapping cells.

In HetNets, a situation where the pico access nodes share the same frequency bands with the macro access nodes often occurs. In particular, a so-called frequency reuse of 1 is often employed where, both, macro and pico access nodes share the entire spectrum to maximize throughput. In other words: different signals may be transmitted via the same frequency band. Due to the overlapping cells, a situation of increased spectral interference may occur.

To reduce spectral interference in HetNets, inter-cell interference coordination (ICIC) can be employed. The different participating access nodes can negotiate static rules which define their share of the transmission resources in time domain and/or frequency domain. The different access nodes are therefore synchronized with each other in coordinated transmission schemes. When data traffic occurs, this data traffic is distributed into the allocated resources and thereby protected against spectral interference. For example, an access node may schedule transmission over the radio interface with a UE to a certain time-slot and/or frequency band where low spectral interference is expected based on the previously negotiated ICIC rules. For examples, the negotiated ICIC rules define a certain pattern where every n-th transmission frame of the radio interface encounters low spectral interference.

In this context, the concept of almost blank subframes (ABS) is known for the 3GPP Long Term Evolution (LTE) standard: such subframes (radio frames of the radio interface in the LTE standard) comprise a very limited amount, i.e., less than possible, of data to reduce usage of the frequency band. In ABS, for example only Cell Specific Reference Symbols (CRS) and possibly some control channel (CCH) data are transmitted in an ABS; in effect, the respective access node can be considered turned off or muted during the ABS.

However, such solutions based on ICIC encounter some limitations. For example, the overall throughput of the mobile communications network may be considerably reduced due to restrictions imposed by the shared transmission resources. Furthermore, the flexibility of protection is limited as such negotiated rules are comparably static.

Therefore, a need exists to provide efficient techniques for providing increased transmission reliability by decreasing spectral interference. In particular, a need exists for providing efficient techniques to protect transmissions against spectral interference.

SUMMARY

According to an aspect, a method for protecting transmission of a control message in a mobile communications network between a first access node and a user equipment is provided. The method comprises, in response to a need for transmitting the control message, transmitting, between the first access node and a second access node, an indication of at least one protected time-slot for transmitting the control message. Said transmitting of the indication prompts reduction of a spectral interference caused by the second access node during the at least one protected time-slot.

According to a further aspect, an access node of a mobile communications network is provided. The access node comprises a first interface for communicating with a further access node and a second interface for communicating with a user equipment connected to the access node. The access node further comprises a processor being configured to control, in response to a need for transmitting a control message between the access node and the user equipment, transmission to the further access node of an indication of at least one protected time-slot. The at least one protected time-slot is for transmitting the control message. Said transmitting of the indication prompts reduction of a spectral interference caused by the further access node during the protected time-slot. The processor is further configured to control transmission of the control message to take place in the at least one protected time-slot.

According to a further aspect, an access node of a mobile communications network is provided. The access node comprises a first interface for communicating with a further access node and a second interface for connecting via a radio interface to one or more user equipment connected to the access node. The access node further comprises a processor being configured to control, in response to a need for transmitting a control message between the further access node and a user equipment connected to the further access node, transmission to the further access node of an indication of at least one protected time-slot. The at least one protected time-slot is for transmitting the control message. Said transmitting of the indication prompts reduction of a spectral interference caused by the access node during the protected time-slot. The processor is further configured to control an emitted spectral power on the radio interface during the least one protected time-slot to reduce the spectral interference with the further access node.

According to a further aspect, a system of access nodes of a mobile communications network is provided. The system comprises a first access node and a second access node. The first access node and/or the second access node are configured to transmit, in response to a need for transmitting a control message between the first access node and a user equipment, an indication of at least one protected time-slot, respectively to the other one of the first access node and/or the second access node. The at least one protected time-slot is for transmitting the control message. Said transmitting of the indication prompts a reduction of a spectral interference caused by the second access node during the at least one protected time-slot. The first access node is configured to transmit the control message in the at least one protected time-slot. The second access node is configured to reduce an emitted spectral power in the least one protected time-slot to reduce the spectral interference with the first access node.

According to a further aspect, a computer program product comprising program code to be executed by a processor of an access node is provided. Execution of the program code causes the access node to perform the above method for protecting transmission of a control message.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

In the following, the invention will be explained in further detail with respect to embodiments illustrated in the accompanying drawings.

DETAILED DESCRIPTION

In the following, exemplary embodiments of the invention will be explained in more detail by referring to the accompanying drawings. The illustrated embodiments relate to techniques for protection of transmission of a control message in a mobile communications network between an access node and a UE. In particular, in the various embodiments at least one protected time-slot is used for said transmitting of the control message wherein during the protected time-slot reduced spectral interference is encountered. Thereby, an increased probability of successful transmission of the control message may be achieved. In the illustrated embodiments, protection of the control message is provided on-demand, e.g., on a per-request basis.

For this purpose, in response to a need for transmitting the control message, an indication of the at least one time-slot may be transmitted between a first access node, to which the UE is connected, and a second access node. The indication can be transmitted from the first access node to the second access node or vice versa.

The indication of the at least one protected time-slot may refer to an indication of a need for the time-slot and/or the indication various parameters, e.g., start, end, duration, of the time-slot. All indications may be explicit or implicit.

Transmitting the control message between the access node and the UE can refer to: transmitting the control message from the access node to the UE and/or transmitting the control message from the UE to the access node.

The access node can be a device for connecting to a UE via a radio interface. In the present mobile communications network, the radio interface may refer to a data connection over the air, i.e., wireless communication. The access node can comprise one or more physical entities and/or can be implemented using hardware and software.

Figure 1:
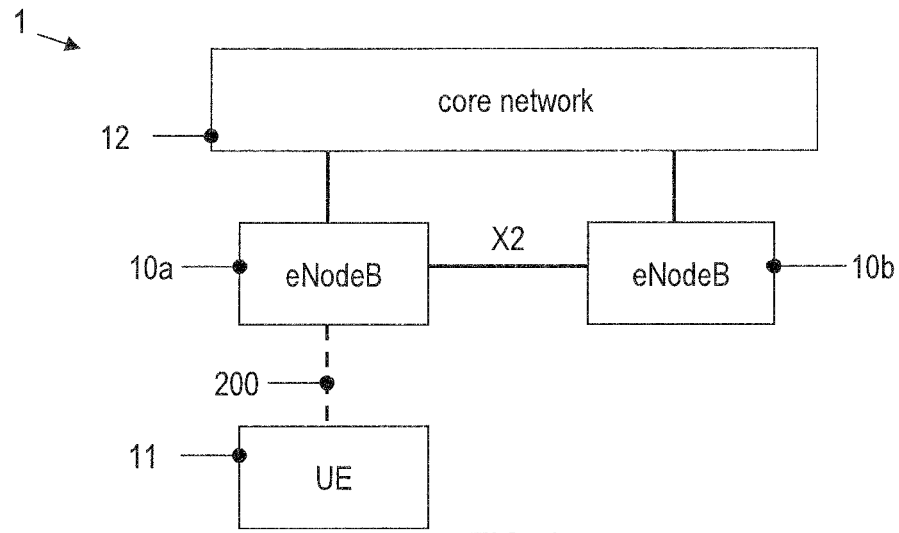
FIG. 1 schematically illustrates a mobile communications network environment according to the 3GPP LTE standard to which concepts according to various embodiments of the invention can be applied.

For example, according to the 3GPP LTE standard, the access node may be implemented as an Evolved Universal Terrestrial Radio Access Network (UTRAN) Node B (eNodeB), cf. FIG. 1. For example, according to the 3GPP UMTS standard, the access node may be implemented as a NodeB in combination with a Radio Network Controller (RNC), cf. FIG. 2.

First, turning to FIG. 1, a first access node 10a in the form of an eNodeB communicates via a X2 interface with a second access node 10b in the form of an eNodeB. Both eNodeBs 10a, 10b are connected to a core network 12, sometimes also referred to as evolved packet core (EPC). These elements are part of a mobile communications network 1. A radio interface 200 connects to a UE 11.

Figure 2:
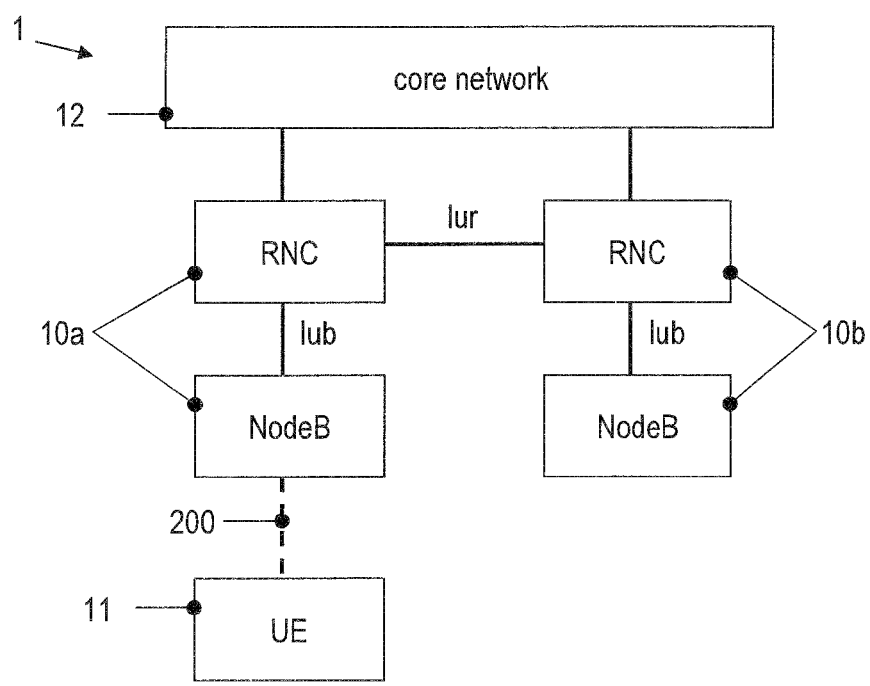
FIG. 2 schematically illustrates a mobile communications network environment according to the 3GPP Universal Mobile Telecommunications System (UMTS) standard to which concepts according to various embodiments of the invention can be applied.

Next, turning to FIG. 2, a situation similar to the situation of FIG. 1 depicted with respect to the 3GPP UMTS standard. The first access node 10a is implemented as a RNC and NodeB which are communicating via a Iub interface. The second access node 10b is implemented as a further RNC with NodeB. The RNC and NodeB may be separate units or may at least partially be combined into one unit, for example as software. The two access nodes 10a, 10b communicate via the Iur interface. In particular, the two RNCs of the two access nodes 10a, 10b communicate via the Iur interface. The RNCs of the two access nodes 10a, 10b are connected to the core network 12. The radio interface 200 is connected with the UE 11 by the NodeB of the first access node 10a.

FIGS. 1 and 2 are not to be construed as being limiting. For example, it is possible that the two access nodes 10a, 10b do not communicate directly with each other. Rather, it is possible that the two access nodes 10a, 10b communicate via an intermediate unit. For example, in the case of FIG. 1, the two eNodeBs 10a, 10b can communicate via a Mobility Management Entity (MME) as defined according to the 3GPP LTE standard.

While different concepts and techniques of various embodiments of the present invention are described primarily with respect to the LTE standard hereinafter, this shall not be construed as being limiting. For example, the concepts can be employed for different mobile communications networks in a comparable manner, for example according to the 3GPP UMTS standard, the General System for Mobile communications (GSM), or the like. For the purpose of illustration, the following scenarios implementing the concepts of various embodiments according to the 3GPP LTE standard, may be useful.

Figure 3:
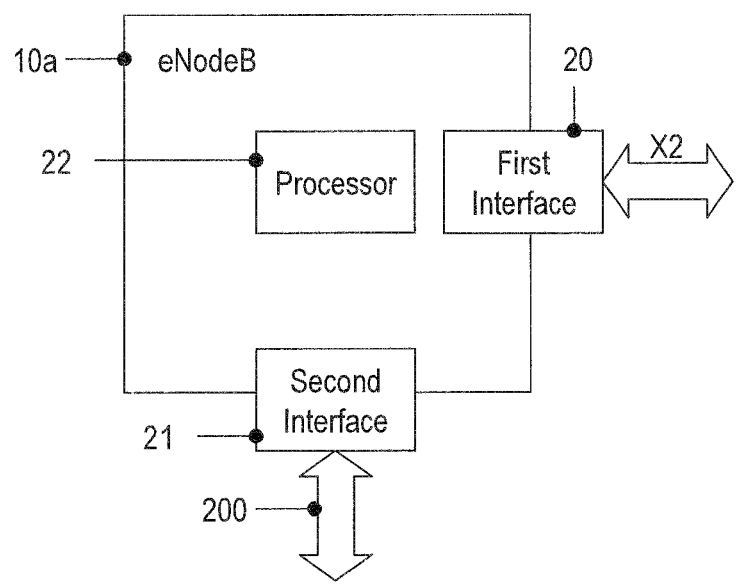
FIG. 3 schematically illustrates an access node in the form of a eNodeB known in mobile communications networks according to the 3GPP LTE standard.

In FIG. 3, the first eNodeB 10a of FIG. 1 is exemplarily depicted in greater detail. The eNodeB 10a comprises a processor 22, a first interface 20, and a second interface 21. The first interface 20 is for communicating with one or more further access nodes (not shown in FIG. 3) via the X2 interface. The second interface is for connecting via the radio interface 200 to one or more UEs 11 (not shown in FIG. 3). The connection with the UE 11 is subject to connection handling. Radio Resource Control (RRC) according to the 3GPP Technical Specification (TS) 36.331 is the main signalling protocol for configuring, re-configuring, and general connection handling in the LTE mobile communications network. RRC controls various functions such as connection setup, handover and mobility, measurements, radio interface failure, and connection recovery.

While in general the techniques of the present invention allow for transmitting of any control message between the first eNodeB 10a and the UE 11, according to various embodiments this control message may be a Handover Command message send from the first eNodeB 10a to the UE 11. Therefore, for sake of illustration, hereinafter various concepts and techniques will be described with respect to a handover scenario, but may be applied to other control messages as well. In this handover scenario the UE 11 is handed over from the first eNodeB 10a to the further eNodeB 10c. A second eNodeB 10b, as well as the further eNodeB 10c, can cause spectral interference. Embodiments described below with respect to the first, second, and further eNodeBs 10a, 10b, 10c can be applied vice-versa to the respective other eNodeBs 10a, 10b, 10c.

The handover scenario—and more generally mobility management—according to the LTE standard is described in further detail below. For example, the UE 11 in LTE can be in two RRC states: "RRC_CONNECTED" and "RRC_IDLE". In the "RRC_CONNECTED" state, a mobility of the UE 11 is network-controlled, i.e., decision and logic functionality related to the mobility of the UE 11 can be executed by, e.g., the eNodeB 10a. Such functions are typically based on, e.g., measurements and/or reports provided by the UE 11. In this respect, the eNodeB 10a can configure various measurement events, thresholds, or the like, based on which the UE 11 then sends the measurements and/or reports. Then a decision of a handover of the UE 11, e.g., from the first eNodeB 10a to a second eNodeB (not shown in FIG. 3) can be based on the measurements and/or reports. For example, if it is detected that the UE 11 moves away from a cell associated with the eNodeB 10a, the handover may be triggered, e.g., to the further eNodeB having a larger signal level at the UE 11. Handover procedures are described with respect to, e.g., 3GPP TSs 36.300 and 36.423. While various embodiments will be described with respect to the "RRC_CONNECTED" state hereinafter, it should be understood that similar techniques and concepts can be applied to the "RRC_idle" state.

Figure 4:
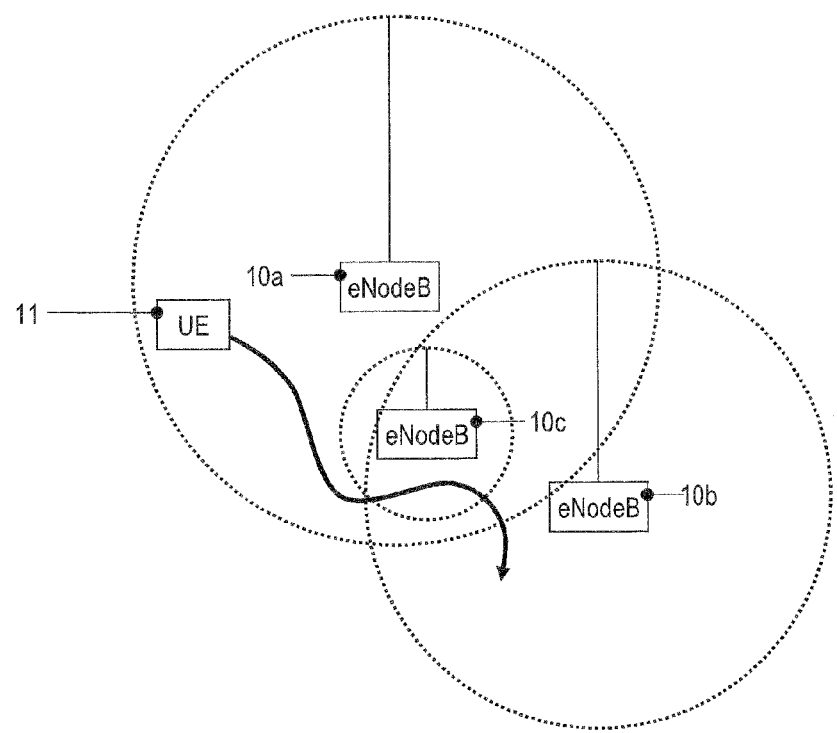
FIG. 4 schematically illustrates a handover scenario of a UE from a source eNodeB to a target eNodeB in a mobile communications network according to the 3GPP LTE standard.

A particular handover scenario is described hereinafter with respect to FIGS. 4 and 5. In FIG. 4, the UE 11 is moving within a cell of the first eNodeB 10a with a certain velocity. The cell is indicated with a dotted line in FIG. 4 and marks the coverage of the first eNodeB 10a. In other words: the signal level of the first eNodeB 10a falls below a certain threshold at the borders of the respective cell.

Because the UE 11 moves out of the cell of the first eNodeB 10a, it should be handed over to a neighbouring cell of a further eNodeB 10c. This cell is also referred to as target cell. The handover should occur before loosing the connection between the UE 11 and the first eNodeB 10a. It can be desirable that the connection is maintained without no or minimal disruption throughout the handover. No or minimal disruption may refer to the user of the UE 11 being unaware of the ongoing handover. In the embodiment of FIG. 4, the further eNodeB 10c is a pico access node of a HetNet.

A handover may involve a number of steps. Initially, a measurement report may be transmitted from the UE 11 to the first eNodeB 10a. For example, the measurement report may be transmitted from the UE 11 to the first eNodeB 10a in response to a so-called A3 event. Such an A3 event may refer to the situation that the signal level of the further eNodeB 10c is larger by a predefined amount that the signal level of the first eNodeB 10a to which the UE 11 is connected. Based on this, the first eNodeB 10a may determine a need for performing the handover in the handover decision. If the handover is required, the first eNodeB 10a may initiate preparation of the handover to the further eNodeB 10c. This may include, e.g., requesting a handover from the further eNodeB 10c. Then, a Handover Command message may be transmitted from the first eNodeB 10a to the UE 11 which commands the UE 11 to execute the handover from the first eNodeB 10a to the further eNodeB 10c.

In response to the received Handover Command message, the UE 11 establishes a connection to the further eNodeB 10c. If the transmission reliability of the radio interface 200 between the UE 11 and the first eNodeB 10a deteriorates significantly during the handover procedure as described above, there is a likelihood of a failed handover. In other words, the handover may not successfully complete and even the connection may be lost. For example, according to 3GPP TS 36.300 timers, timestamps, and thresholds are employed in order to adequately configure measurements, such that the need for the handovers is detected sufficiently early before the radio interface 200 deteriorates significantly.

Another reason for a deteriorated radio interface 200 reliability may be spectral interference encountered during the handover. In the scenario of FIG. 4, a second eNodeB 10b is present. The second eNodeB 10b can cause spectral interference with, both, the first eNodeB 10a and the further eNodeB 10c. Likewise, the first eNodeB 10a and/or the further eNodeB 10c can cause spectral interference during the handover.

It may occur that a UE 11 looses connection to the first eNodeB 10a, e.g., when the UE 11 enters a fading dip or if the handover fails as set forth above due to the impaired radio interface 200. This is particularly true if a handover region is very small. A handover region may be defined as the region where, both, a signal level of the first eNodeB 10a to which the UE 11 is connected, as well as a signal level of the further eNodeB 10c to which the UE 11 is about to connect, are within a predefined range.

Figure 5:
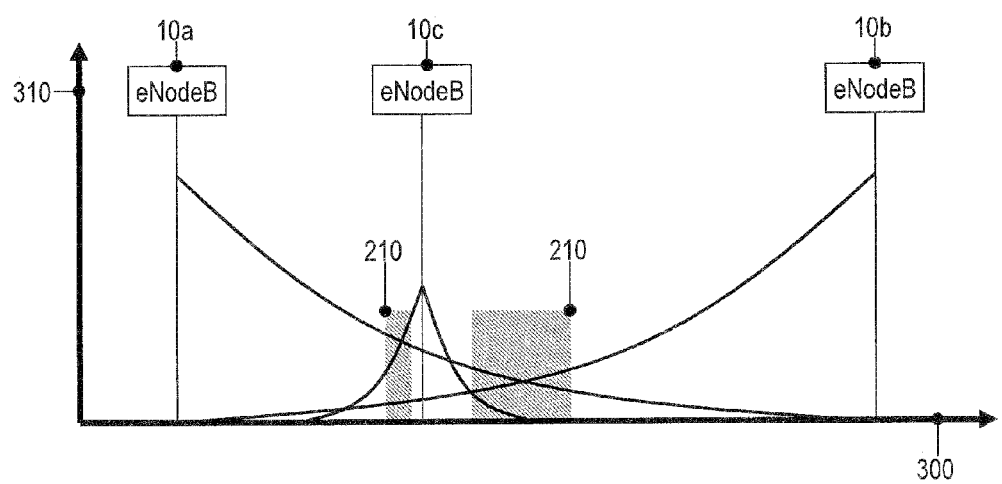
FIG. 5 illustrates a handover scenario comparable to the one of FIG. 4 with respect to signal levels of the source and target access nodes and a further interfering access node.

Such a situation is illustrated in FIG. 5. FIG. 5 illustrates the signal level 310 for various positions 300. A maximum signal level 310 is obtained at the position of the respective eNodeBs 10a, 10b, 10c. In FIG. 5, two handover regions are illustrated by the dashed areas. Within the handover regions, a handover 210 is likely to occur. As can be seen from FIG. 5, the handover region between the first eNodeB 10a and the further eNodeB 10c is smaller than the handover region between the first eNodeB 10a and the second eNodeB 10b. From FIG. 5 it is apparent that in the handover region between the first eNodeB 10a and the further eNodeB 10c, the signal level 310 of the second eNodeB 10b is significant and may, therefore, cause spectral interference.

By monitoring quality of the radio interface 200, e.g. on the physical layer as described in 3GPP TS 36.300, TS 36.331, and TS 36.133, the UE 11 itself is able to declare a radio interface 200 failure and autonomously start a RRC re-establishment procedure. If the re-establishment is successful, then the connection between the UE 11 and the first eNodeB 10a can resume. A failure of a re-establishment can result in the UE 11 switching to the operation mode "RRC_IDLE" and release of the connection. To continue communication, a entirely new RRC connection can be requested and established. Handover failures are discussed in 3GPP Technical Report (TR) 36.839.

Figure 6:
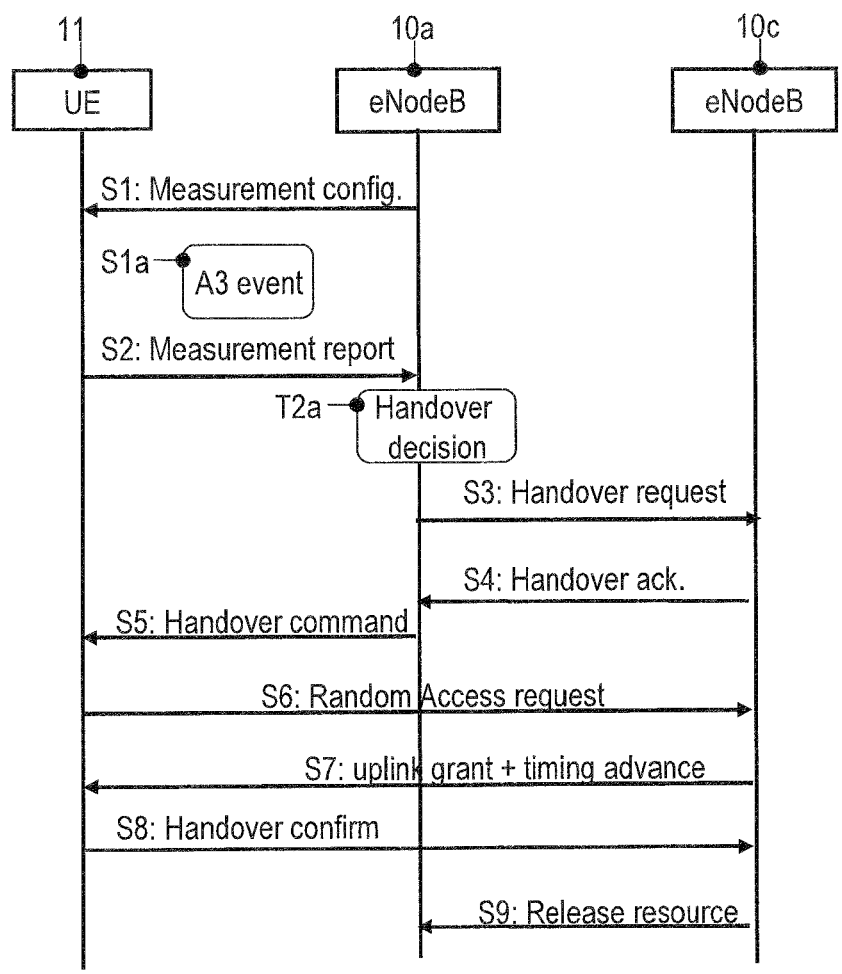
FIG. 6 is a signalling diagram of a handover routine according to the 3GPP LTE standard.

FIG. 6 is a signalling diagram for a handover according to the LTE standard. For example, the signalling as depicted in FIG. 6 may apply to the scenarios depicted in FIGS. 4 and 5 and discussed above. Initially, the first eNodeB 10a, i.e., the source eNodeB, configures the UE 11 with a measurement configuration (step S1) and, in response to the "A3 event", the UE 11 reports that a target cell of the further eNodeB 10c provides a better interface than the source cell of the first eNodeB 10a (step S2). Other events triggering step S2 are known.

The first eNodeB 10a decides if it should handover the UE 11 to the further eNodeB 10c ("Handover Decision"). If so, the first eNodeB 10a requesting admission at the further eNodeB (step S3) and waits for acknowledgement (step S4) before transmitting a Handover Command message to the UE 11 (step S5). Typically, the Handover Command message of step S5 is prepared at least partly by the further eNodeB 10c and contained in the Handover Acknowledgement message of step S4.

The Handover Command message of step S5 contains necessary instructions for the UE 11 to execute the handover to the further eNodeB 10c. Based on this, the UE 11 connects to the further eNodeB 10c via a Random Access Request message containing a dedicated preamble (step S6). The further eNodeB 10c responds to this Random Access Request Message by the uplink (UL) grant and Timing Advance which relates to transmission timing and is estimated based on the preamble of step S6.

The UE 11 then confirms the handover to the further eNodeB 10c by indicating that the handover procedure is completed (step S8). This may be achieved by a so-called RRCConnectionReconfigurationComplete message.

The further eNodeB 10c sends a UE Context Release message to the first eNodeB 10a to inform success of the handover 210 of the UE 11 (step S9). The first eNodeB 10a can then release resources previously assigned to the UE 11.

As can be seen from the above, successful completion of the handover requires successful transmission of, at least, the Handover Command message in step S5 and the Random Access Request message in step S6. Various embodiments of the invention provide methods for transmitting such a control message during a protected time-slot during which reduction of spectral interference with further access nodes is prompted. As such messages can be critical to the success of the handover, this may have the effect of decreased failure likelihood of the handover.

For this, in response to a need for transmitting the control message, an indication of at least one protected time-slot for transmitting the control message is transmitted. In the embodiment of FIGS. 4-6, the control message can be the Handover Command message of step S5 and the indication can be transmitted from the first eNodeB 10a to the further eNodeB 10c and/or the second eNodeB 10b. It is also possible that the indication is transmitted alternatively or additionally from the further eNodeB 10c and/or the second eNodeB 10b to the first eNodeB 10c. Further interfering eNodeBs may be included in the transmission of the indication. The need for transmitting the Handover Command message may relate to the outcome of the handover decision. If it is determined that the handover is required, there is also a need for transmitting the Handover Command message. In other words, taking the decision to perform the handover also implies determining the need for transmitting the Handover Command message.

The above transmission of the indication prompts reduction of the spectral interferences caused by the second access node 10b and/or the further access node 10c during the at least one protected time-slot. For example, when the indication is transmitted from the first eNodeB 10a to the further eNodeB 10c, this requests the further eNodeB 10c to reduce spectral interference during the respective at least one protected time-slot. Likewise, if the indication is transmitted from the further eNodeB 10c to the first eNodeB, this indicates that the further eNodeB will provide reduced spectral interference during the respective at least one protected time-slot. Accordingly, "prompting" reduced interference can mean requesting or reporting future reduction of spectral interference. Typically, this future reduction of spectral interference is temporary, e.g., provided only in the protected time-slot.

For sake of simplicity, in the following it will be assumed that the handover takes place between the first eNodeB 10a and the further eNodeB 10c and that the spectral interference is caused by the second eNodeB 10b. Yet it should be understood that various embodiments cover other configurations. For example, it is possible that the handover occurs between the first and second eNodeBs 10a, 10b. In other words it is possible that the target eNodeB causes the spectral interference. It is also possible that a plurality of eNodeBs cause spectral interference.

Figure 7:
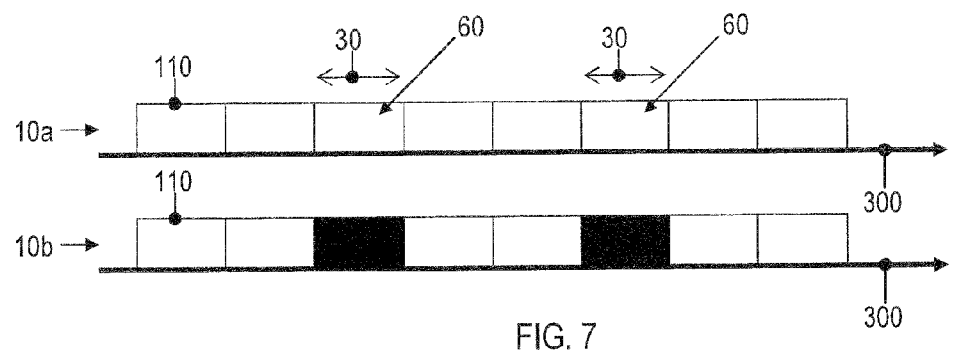
FIG. 7 illustrates, in the time-domain, use of a protected time-slot for transmission of a control message.
Figure 8:
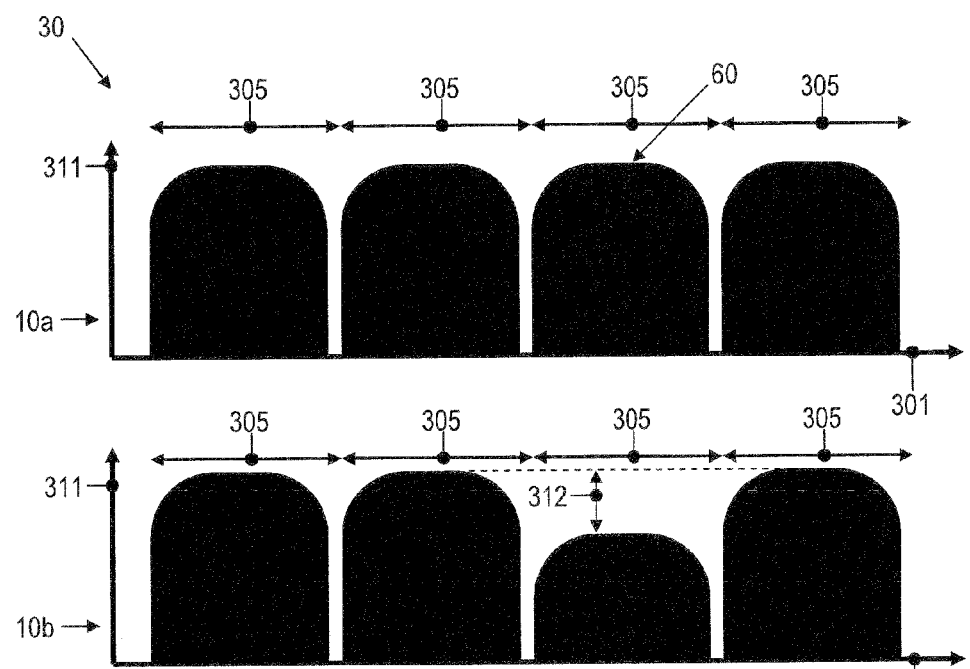
FIG. 8 illustrates, in the frequency-domain, use of a protected time-slot for transmission of a control message.

In FIGS. 7 and 8, techniques for reducing the spectral interference during the at least one protected time-slot are discussed.

In FIG. 7, a sequence of subframes 110 used for data communication over the radio interface 200 of the mobile communications network 1 is depicted as a function of time 300. The upper row illustrates the sequence for transmission to and from the first eNodeB 10a. The lower row illustrates the sequence for transmission to and from the second eNodeB 10b. As can be seen from FIG. 7, the first and second eNodeBs 10a, 10b are synchronized.

The second access node 10b is configured to reduce an emitted spectral power during the two protected time-slots 30. This is graphically indicated by the two dark subframes 110. Because the second eNodeB 10b reduces the emitted spectral power, the spectral interference with the first eNodeB 10a is reduced during the protected time-slots 30. The emitted spectral power may refer to the total power emitted into a certain frequency band. In the protected time-slot 30, the control message 60 can be transmitted by the first eNodeB 10a as indicated in FIG. 7.

Various approaches to said reducing of the emitted spectral power are discussed hereinafter. For example, it is possible that the second eNodeB 10b limits the transmit power to a predefined value and/or by a predefined amount during the protected time-slot 30. The transmit power may relate to the overall power level used for transmission by the eNodeB 10b and may be measured in dBm.

Additionally or alternatively, may also be possible to partly or fully interrupt, i.e. temporarily intermit, transmission of control data and/or payload data. In a simple embodiment, it is possible to fully interrupt transmission of the second eNodeB 10b during the protected time-slot 30. In various embodiments, the transmission may be partly interrupted. This may be achieved, e.g., by using ABS. Another approach is to use Multicast-Broadcast Single Frequency Network (MBSFN) subframes as defined by the 3GPP TS 36.331. In latter case, uplink scheduling grants can still be communicated between a target eNodeB and the UE 11, since in MBSFN subframes typically the control region is not interrupted.

When using a ABS or MBSFN subframes, parts or the entire subframe 110 are not carrying data (muted). Due to load conditions at the second eNodeB 10b and due to the size of control message 60, sometimes it might not be desirable to mute an entire subframe 110. This may be particularly true if the second eNodeB 10b is a macro eNodeB of a HetNet which, e.g., is connected to a large number of UEs. Therefore, a reduction of the transmit power may be employed instead. Albeit in various embodiments it may be employed additionally to embodiments as described above. In such embodiments, it may be easier for the second eNodeB 10b to perform the respective scheduling of transmission: the second eNodeB 10b can still schedule communication with further UEs not requiring high transmit power during the protected time-slot 30. Such further UEs may be physically near to the second eNodeB 10b. Such subframes with reduced transmit power may be referred to reduced power subframes (RPS). When using RPS, the amount of transmit power reduction can be communicated between the involved access nodes, e.g., the first and second access nodes 10a, 10b.

Concepts for said reducing of the emitted spectral power can be applied to the entire frequency spectrum or only fractions thereof, i.e., to one or more frequency bands. Such frequency bands may be predefined or can be included in said transmitting of the indication; they may be, in other words, be negotiated between the first and second eNodeBs 10a, 10b.

In FIG. 8, the emitted spectral power 311 is illustrated as a function of frequency 301 for four frequency bands 305 forming the spectrum at a point in time during the at least one protected time-slot 30. As can be seen, in the embodiment of FIG. 8, the emitted spectral power 311 is limited for one frequency band 305 in the second eNodeB 10b (depicted in the lower row of FIG. 8). A power reduction level 312 is indicated. In this frequency band 305, the protected control message 60 can be transmitted.

The FIGS. 7 and 8 shall not be construed as being limiting. For example, a larger or smaller number of protected time-slots 30 (frequency bands 305) may be employed in FIG. 7 (FIG. 8) to reduce spectral interference. Also, while in FIG. 7 the protected time-slot 30 has been shown to be defined with respect to the subframes 110, it is also possible that the protected time-slot 30 is defined with respect to a start time and an end time or duration, i.e., partially or fully independent of the radio frames of the radio interface 200. It is also possible that the protected time-slot 30 is defined with respect to multiple subframes 110 or fractions of the subframes 110, e.g., according to 3GPP LTE resource blocks.

In the foregoing, techniques for reducing the emitted spectral power 311 during the protected time-slot 30 have been discussed. In the following, techniques for transmitting the indication of the protected time-slot 30 will be discussed in further detail.

As shown by FIGS. 9A-9E, transmitting of the indication can comprise, e.g., sending a first message 100 from the first eNodeB 10a to the second eNodeB 10b and/or sending a second message 101 from the second eNodeB 10b to the first eNodeB 10a. The first message 100 can have the function of requesting the at least one protected time-slot 30 from the second access node 10b, i.e., to indicate the need for the at least one protected time-slot 30. For example, this may be achieved by implicit indication or by explicit reference to one or more time-slots. The first and second messages 100, 101 can be part of negotiating of the at least one protected time-slot 30 between the eNodeBs 10a, 10b.

However, it should be understood that it is not necessary to transmit both messages 100, 101. For example, in various embodiment, both first and second eNodeBs 10a, 10b can be configured to handle the indaction of the at least one protected time-slot 30 implicitly. I.e., the first eNodeB 10a can indicate the at least one protected time-slot 30 to the second eNodeB 10*b* even if it did not receive a request, and/or vice versa. In case the at least one protected time-slot 30 is indicated to the first eNodeB 10*a*, it can schedule said transmitting of the control message 60 in at least some of the at least one protected time-slot 30, even if the first eNodeB 10*a* did not request the at least one protected time-slot 30 before.

Figure 9A:
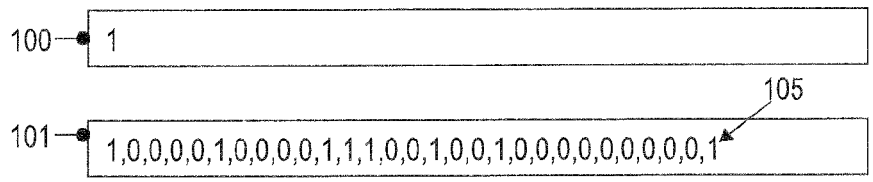
FIG. 9A illustrates transmission of an indication of at least one protected time-slot according to various embodiments of the invention.

Turning to FIG. 9A, where the first message 100 contains a single indicator 105, e.g., a single bit set to "TRUE". This indication of the at least one protected time-slot 30 may have the effect that the second eNodeB 10*b* is informed about the request for the protected time-slot 30 and returns the second message 101 which includes indicators 105 indicating the position of the at least one protected time-slot 30. In the embodiment of FIG. 7A, this indicating is done explicitly by transmitting a bitmap, field, or array where the different entries relate to different subframes 110. Those protected subframes 110, i.e., which correspond to the at least one protected time-slot 30, are marked with "TRUE".

Figure 9B:
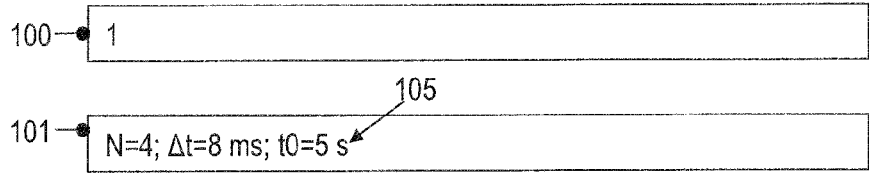
FIG. 9B illustrates transmission of an indication of at least one protected time-slot according to various embodiments of the invention.
Figure 9C:
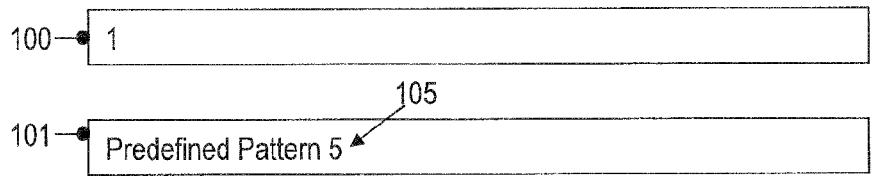
FIG. 9C illustrates transmission of an indication of at least one protected time-slot according to various embodiments of the invention.

In FIG. 9B, the indicators 105 in the second message 101 implicitly indicate 4 subframes ("N=4") by specifying that they will be arranged with 8 ms interval ("Δt=8 ms") in 5 ms from current time ("t0=5 ms"). Other techniques for implicitly indicating the at least one protected time-slot 30 are possible. For example, this may be achieved via predefined rules or patterns, cf. FIG. 9C. The rules or patterns may comprise such scenarios as: "every subframe 110 with sequence number modulus 200 equals 0 corresponds to protected time-slot 30" or "4 subframes, one each 8 ms" or "6 periods of the pattern" or "pattern until subframe with sequence number 205"; these are specific examples which are not limited to the particular values used therein. Various patterns can be requested and/or indicated. The embodiment of FIG. 9C may have a particular small need for bandwidth, but may have limited flexibility.

Figure 9D:
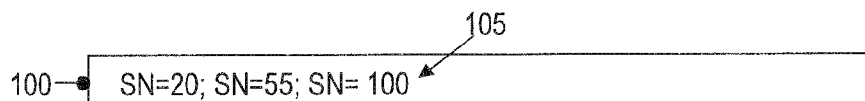
FIG. 9D illustrates transmission of an indication of at least one protected time-slot according to various embodiments of the invention.

In FIG. 9D, the first message 100 includes the indicators 105 indicating the position of the at least one protected time-slot 30. For example, in various simple embodiments, it is possible that the first eNodeB 10*a* merely sends this first message 100 to prompt the second eNodeB 10*b* to reduce spectral interference during as many of these indicated protected time-slots 30 as possible. Then it is even possible that the second eNodeB 10*b* does not respond in any way to this first message 100. Yet, in the embodiment of FIG. 9D, the second eNodeB 10*b* responds by sending the second message 101, positively and negatively acknowledging the different protected time-slots 30 of the first message 100. In that sense, the protected time-slots 30 of the first message 100 can be referred to as candidate time-slots, because based on the second message 101, the first eNodeB 10*a* can decide which of the candidate time-slots 30 can be in fact expected to have reduced spectral interference. Based on this, the first eNodeB 10*a* can select the at least one protected time-slot 30.

Figure 9E:
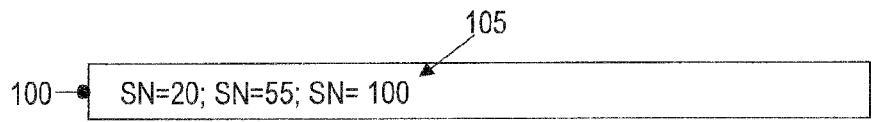
FIG. 9E illustrates transmission of an indication of at least one protected time-slot according to various embodiments of the invention.

In FIG. 9E, a simple embodiment is depicted where the various candidate time-slots of the first message 100 are not individually acknowledged and/or negatively acknowledged, but merely an overall acknowledgement is sent. For example, the first eNodeB 10*a* recommends the candidate subframes 110 via the indicators 105 to the second eNodeB 10*b* in the first message 100. If the second eNodeB 10*b* can satisfy this request, it simply replies in the second message 101 with a "yes" flag—and if not, it can specify the subframe 110 for the protected time-slot 30, e.g., as in FIG. 9A. Based on this, the first eNodeB 10*a* may select the particular at least one protected time-slot 30.

Figure 9F:
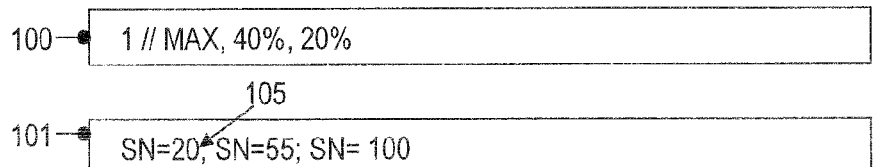
FIG. 9F illustrates transmission of an indication of at least one protected time-slot according to various embodiments of the invention.

In FIG. 9F, the first message 100 indicates the need for the at least one protected time-slot 30 via a "TRUE" field. The second message 101 includes the indicators 105 explicitly indicating the positions of three protected time-slots 30 by means of sequence numbers of subframes 110. The first message 101 includes further information: first, an urgency of the transmitting of the control message is included ("MAX"). The urgency is a measure of the desired delay until the transmitting of the control message 60. For example, if the control message 60 is the Handover Command message as discussed above, the urgency may depend on a velocity of the UE 11 and/or the measurement reports. While in FIG. 9F, the urgency is implicitly indicated, it is also possible to explicitly indicate the urgency, for example by a measure in milliseconds. Second, a spectral interference level at the UE 11 is included ("40%"); third, the power reduction level 312 for the reduction of the spectral interference is included ("20%"). The power reduction level 312 could also contain a explicit delta power, e.g., measured in dB or dBm. Such information can be used by the second eNodeB 10*b* when selecting the at least one protected time-slot 30.

Such information, as discussed above with respect to the first message 100, may also be included in the second message 101. For example, if a plurality of protected time-slots 30 is used, the power reduction level 312 could be included for each one of the plurality of protected time-slots 30. Furthermore, it is possible to include information on the frequency bands 305 for which emitted spectral power 311 shall be reduced, cf. FIG. 8.

FIGS. 9A-9F shall not be construed as being limiting. For example, different combinations of these embodiments are possible. For example, in the embodiment of FIG. 9A it is possible to use explicit indication of subframes 110 by means of sequence numbers, e.g., as in FIGS. 9D and 9E. While in the FIGS. 9A-9F indication of a plurality of protected time-slots 30 has been communicated, such techniques may be applied as well for a single protected time-slot 30. Certain information content of the first message 100 and/or second message 101 does not need to be contained in a single message, but in a plurality of individual messages. For example, the information of the pattern used, cf. FIG. 9C, may be sent separately form the information of the duration of the usage of the pattern, cf. FIG. 9B.

Generally speaking, it is possible to include a step of selecting the protected time-slot 30 in the first access node 10*a* and/or the second access node 10*b*. The selecting can be based on various information such as the urgency of the transmitting, the spectral interference level, and/or the power reduction level 312 etc. The logic of the selecting of the protected time-slot 30 can be situated fully or in parts in either the first or second access node 10*a*, 10*b*. This is closely related to the information content of the particular first message 100 and/or second message 101 that are exchanged between the first and second access nodes 10*a*, 10*b*. To this respect, the first message 100 may be referred to as a time-slot request message and the second message 101 may be referred to as a time-slot reply message. Implementations where the selecting is situated in the first eNodeB 10*a* can be, as for example illustrated in FIG. 9D, 9E. Implementations where said selecting is situated in the second eNodeB 10*b* can be, as for example illustrated in FIGS. 9A-9C, and 9F.

Irrespective of the particular embodiment of the indication, e.g., irrespective what particular sort of indicators 105 according to the embodiments of FIGS. 9A-9F is used, generally it is possible to transmit the indication of the at least one protected time-slot 30, e.g., as a separate message. It is also possible to include the indication in another message which is exchanged as part of standard procedures. One example would be to send the indication as part of a Handover Request message and/or a Handover Request Acknowledge message (Handover Reply message) and/or Handover Preparation Failure message as specified by 3GPP TS 36.423.

For example, for this purpose parts of the conventional 3GPP TS 36.423 standard may be re-used. For example, this applies to the Invoke Indication as defined in TS 36.423, sub-clause 9.2.55 which could be used to request a second message 101 as indicated in FIG. 9A.

For example, the Handover Request message as defined in 3GPP TS 36.423, sub-clause 9.1.1.1 could be supplemented by a respective field, e.g., called "ABS Request", e.g., with assigned criticality set to "ignore". This field might have a mandatory presence or an optional presence and contain optional sub-fields such as the urgency indication or the candidate time-slots. This field could, in other words, correspond to the first message 100.

For example, the Handover Request Acknowledge message as defined in 3GPP TS 36.423, sub.-clause 9.1.1.2 could be supplemented by a respective field, e.g., called "ABS Grant", e.g., with assigned criticality set to "ignore". This field could indicate if a prior request for on demand ABS was granted and, optionally, indicate additionally which time-slots 30 were granted, or for how long a certain pattern of protected time-slots 30 is applied. This field might have a mandatory presence or an optional presence. This field could, in other words, correspond to the second message 101.

Figure 10:
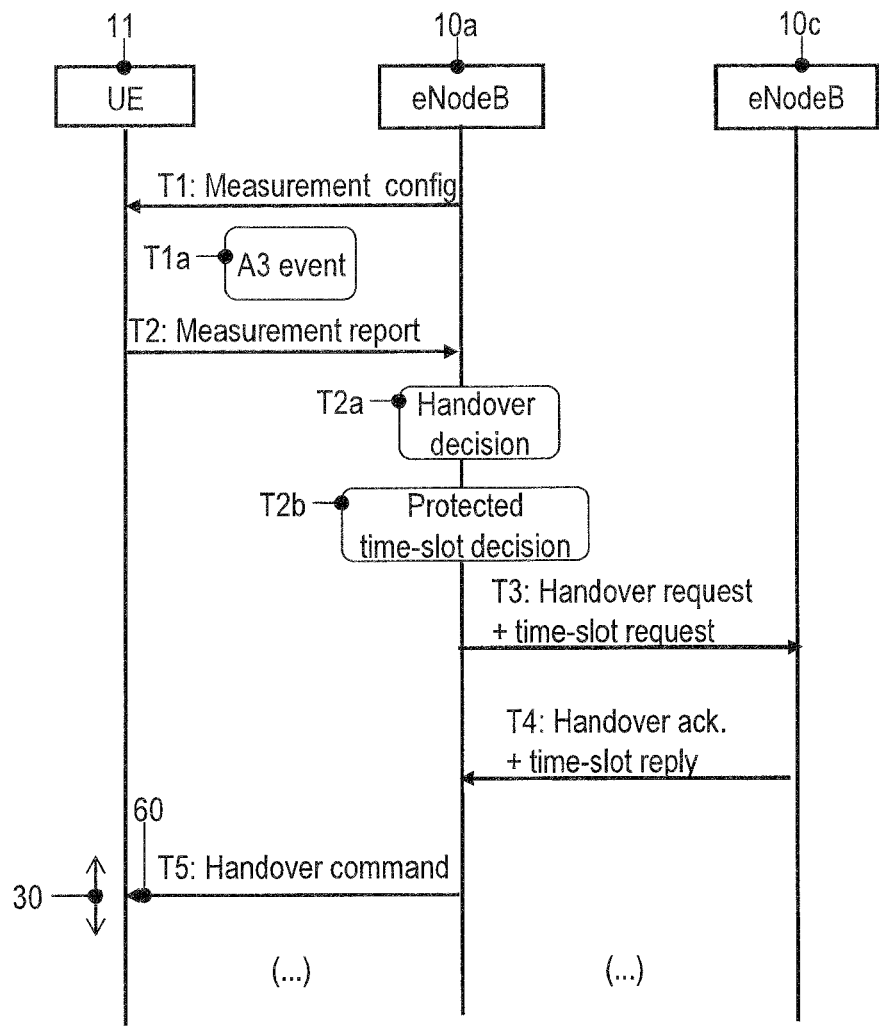
FIG. 10 is a signalling diagram of a handover routine according to the 3GPP LTE standard employing techniques according to various embodiments of the invention.

It may therefore be possible to send the first and second messages 100, 101, e.g., as part of the messages exchanged in steps S3 and S4 in FIG. 6. Such a scenario is shown in FIG. 10 being a signalling diagram of a handover according to the 3GPP LTE standard and further implementing techniques according to various embodiments of transmitting the control message 60, here a Handover Command message, during the at least one protected time-slot 30. For simplification, only the initial steps are depicted in FIG. 10, i.e., up to step T5 which corresponds to step S5 of FIG. 6. In FIG. 10 the handover is executed between the first eNodeB 10*a* and the further eNodeB 10*c*. In this scenario, the further eNodeB 10*c* causes spectral interference and the protection scheme according to various embodiments of the invention is applied against this spectral interference caused by the further eNodeB 10*c*. Yet it should be understood that, in general, the protection scheme may be applied with respect to other and/or further interfering eNodeBs, such as the second eNodeB 10*b* etc.

In FIG. 10, the first and second messages 100, 101 are transmitted as part of the Handover Request message and Handover Reply message in steps T3 and T4. Steps T1, T2, and T5 correspond to steps S1, S2, and S5 of FIG. 6. Step T5 is executed in the at least one-protected time-slot 30 as prompted by the first message 100 and/or second message 101 exchanged in steps T3 and T4. The first eNodeB 10*a* waits until the indicated protected time-slot 30 to send the Handover Command message then (step T5). In other words, the first eNodeB 10*a* can adjust its scheduling behavior accordingly. The further eNodeB 10*c* reduces the emitted spectral power 311 as discussed with respect to FIGS. 7 and 8 above, e.g., via ABS and/or RPS. The first eNodeB 10*a* sends the Handover Command message within a subframe in the protected time-slot 30. Due to the decreased amount of interference received from the further eNodeB 10*c*, the Handover Command message is more likely to be received by the UE 11.

In a simple embodiment, always when the need for transmitting the control message 60 is determined, e.g., as a result of step T2*a*, the indication of the at least one protected time-slot 30 is transmitted (steps T3, T4). However, it is also possible to base said transmitting, i.e., the employment of the at least one protected time-slot 30 on an optional decision finding (step T2*b*). The decision-finding can determine whether it is at all necessary to use further protection or if, e.g., the loss likelihood of the control message 60 given certain parameters is sufficiently small. In the embodiment of FIG. 10, the first access node 10*a* establishes if the at least one protected time slot is required (step T2*b*). Said establishing can be based on the measurement report of step T2, i.e., based on how strong the signal levels of first eNodeB 10*a* and/or the further eNodeB 10*c* are, transmit powers of the first and further eNodeBs 10*a*, 10*c*, latest channel quality (CQI) reports, information on previous handovers, e.g., history information on previously transmitted control messages such as failure rates, a count of pending handovers, e.g., for further UEs connected to the first eNodeB 10*a*, information on a velocity of the UE 11, preconfigured rules, etc. The CQI may, for example, relate, e.g., indirectly, to a likelihood of transmission failure of transmission over an radio interface of the mobile communications network 1. If the first eNodeB 10*a* decides that additional protection of the Handover Command message in step T5 is required, it will selectively include the indication in the Handover Request message sent in step T3.

Similar criteria as stated above in connection with the establishing of the need of the at least one-protected time-slot in step T2*b* can be applied to the handover decision finding in step T2*a*.

Figure 11:
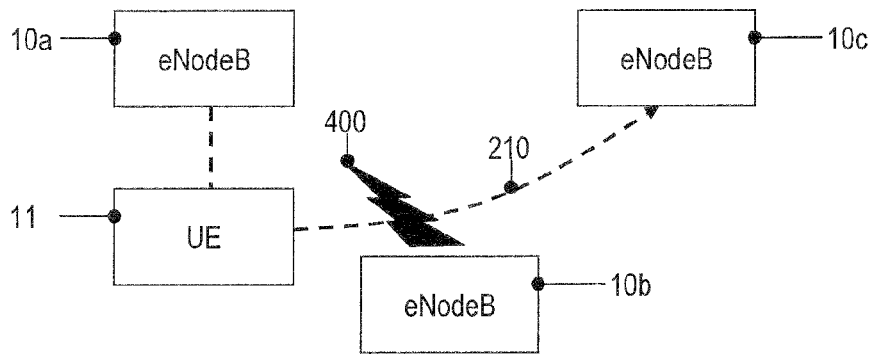
FIG. 11 schematically illustrates a handover scenario of a UE from a source eNodeB to a target eNodeB in a mobile communications network according to the 3GPP LTE standard where a further interfering eNodeB is present.

In the embodiment of FIG. 10, there are two participating eNodeBs, namely the first eNodeB 10*a* and the further eNodeB 10*c* as source and target eNodeBs of the handover. Here the further eNodeB 10*c* cause spectral interference, as well. However, various embodiments of the present invention relate to scenarios where there are more than two participating eNodeBs, cf. FIGS. 4 and 5. Such a scenario is schematically illustrated in FIG. 11. In FIG. 11, the UE 11 connected to the first eNodeB 10*a* is handed over to the further eNodeB10*c*. The second eNodeB 10*b* creates spectral interference 400. One particular example for such a scenario would be, in a HetNet, a handover between two pico eNodeBs10*a*, 10*c* both interfered by an overlaying macro eNodeB 10*b*. While for sake of simplicity, in FIGS. 10-13 there is only one second eNodeB 10*b*, the techniques discussed in this context can be applied directly to a plurality of interfering eNodeBs.

Figure 12:
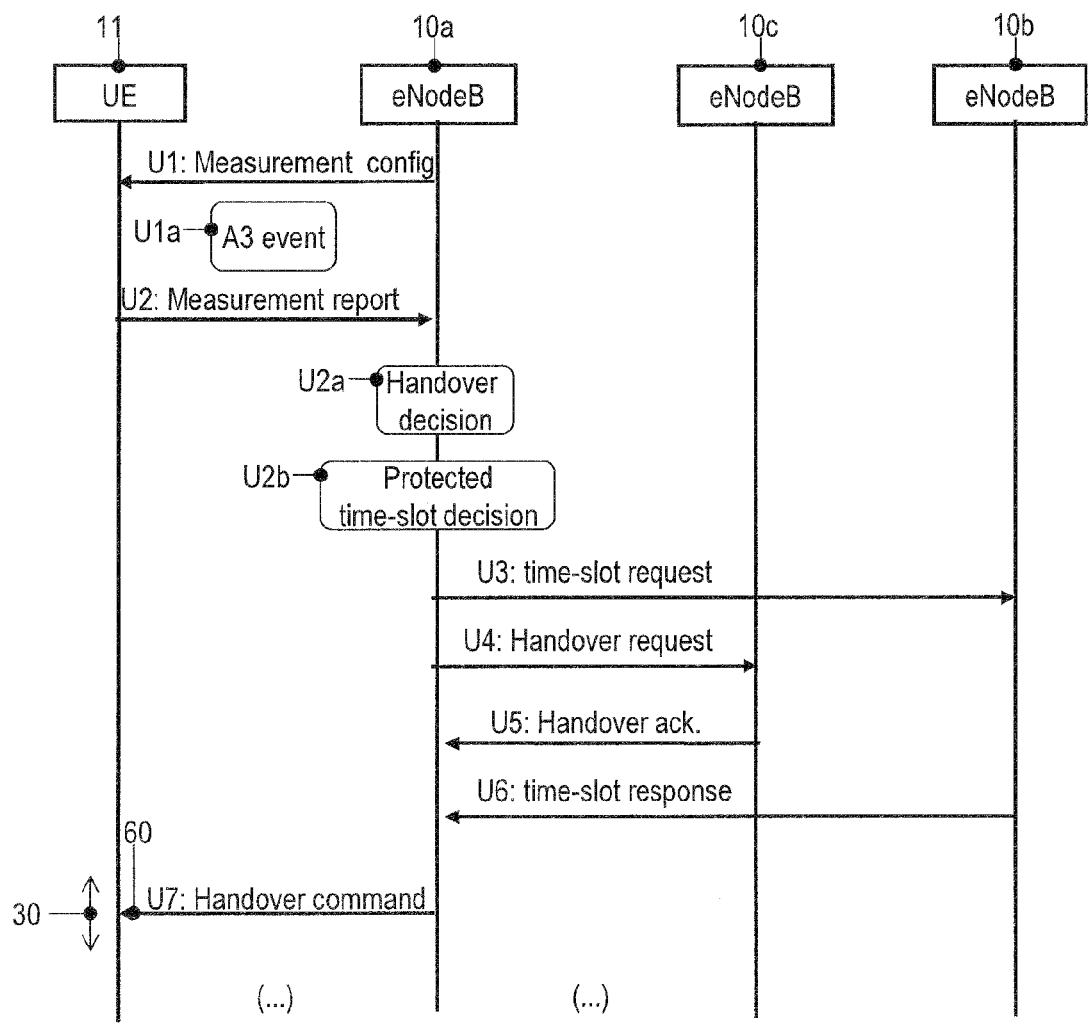
FIG. 12 is a signalling diagram of a handover routine according to the 3GPP LTE standard employing techniques according to various embodiments of the invention.

In FIG. 12, a signalling diagram for a such a scenario is shown. Steps U1-U2*b* correspond to steps T1-T2*b* of FIG. 11. In step U3, the time-slot request 100 is sent, e.g., as a separate message, to the interfering, second access node 10*b*. For example, the time-slot request 100 may correspond to the embodiment of FIG. 9D. Steps U4 and U5 correspond to steps S3 and S4 of FIG. 6. In step U6, the time-slot response 101 is sent from the second eNodeB 10*b* to the first eNodeB 10*a*.

For example, the time-slot response 101 of step U6 may correspond to the embodiment of FIG. 9D. For example, the indication in step U6 may be achieved using the "Load indication" as defined by 3GPP TS 36.423 sub-clause 8.3.1; this could allow to transmit information on the at least one protected time-slot 30, for example a pattern with duration of a plurality of protected time-slots 30. In a further simple scenario, a dedicated message may be used.

In the protected time-slot 30, e.g., as indicated via the messages 100, 101 of steps U3, U6, the first eNodeB 10a sends the Handover Command message (step S7) to trigger the handover 210 of the UE 11 to the further eNodeB 10c. Step S7 corresponds to step T5 of FIG. 10.

In FIG. 12, said selecting of the at least one protected time-slot 30 is performed in the first eNodeB 10a. However, for example if there is only one second eNodeB 10b (and not a plurality of interfering eNodeBs), said selecting may also be fully or partially performed in the second eNodeB 10b.

Figure 13:
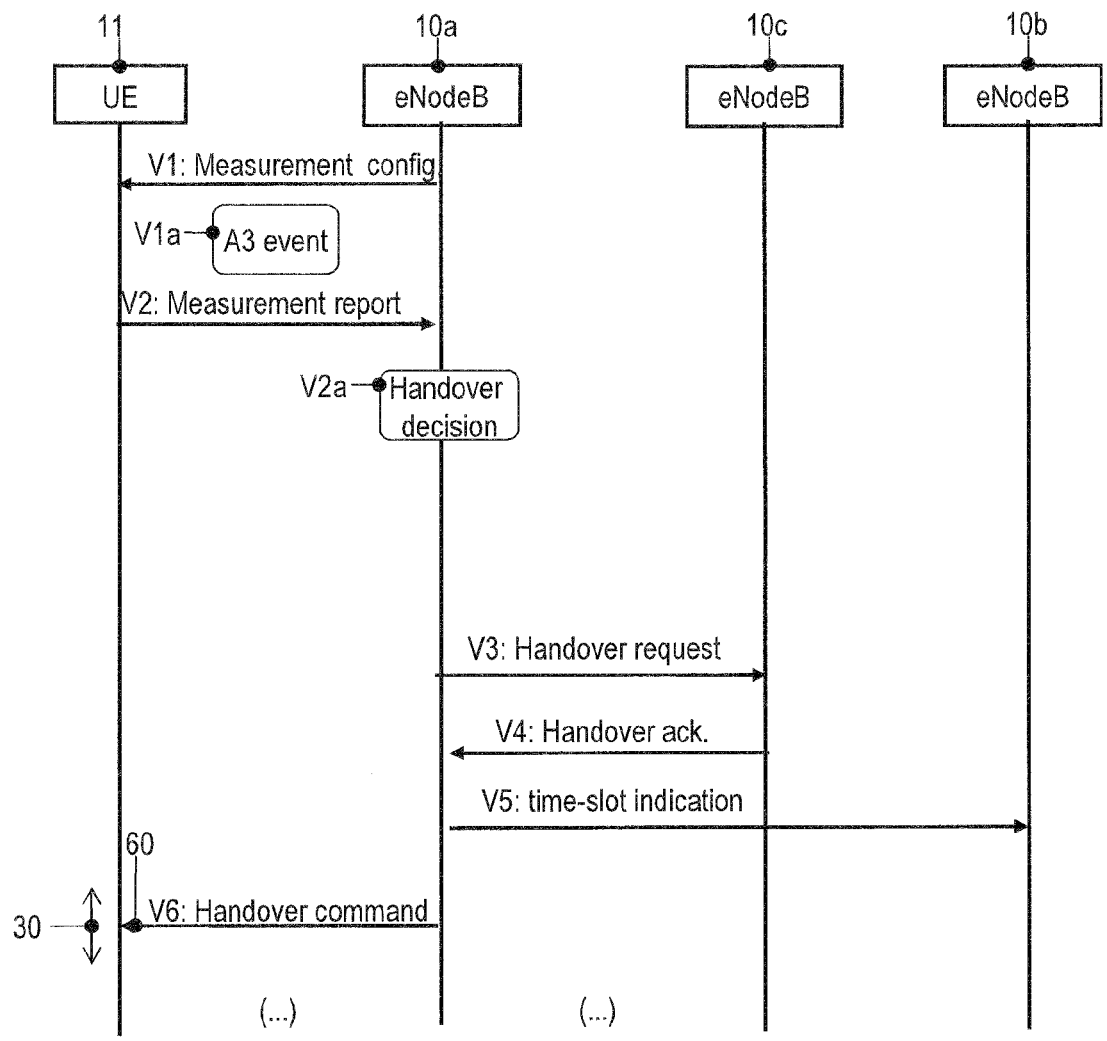
FIG. 13 is a signalling diagram of a handover routine according to the 3GPP LTE standard employing techniques according to various embodiments of the invention.

In FIG. 13, an alternative embodiment for a scenario with the three participating eNodeBs 10a, 10b, 10c is illustrated. The steps V1-V2a correspond to the steps U1-U2a of FIG. 12. The steps V3, V4 correspond to the steps U4, U5 of FIG. 12. In step V5, the indication of the at least one protected time-slot 30 for transmitting the control message 60, i.e., in FIG. 13 the Handover Command message (step V6), is transmitted from the first access node 10a to the second access node 10b. In the embodiment of FIG. 13, this indication includes the indictors 105 to inform the second access node 10b of the position of one or more protected time-slots 30 selected by the first eNodeB 10a. The first eNodeB 10a prompts (in the sense of reporting) the at least one protected time-slot 30. No response to said transmitting in step V5 is required. In this case, the second eNodeB 10b will try to schedule any traffic such that the indicated time-slots 30 can be protected. In the embodiment of FIG. 13, no establishing whether the protected time-slot 30 is required is executed, i.e., step U2b of FIG. 12 is skipped. As the selected protected time-slots 30 are merely reported (without negotiation), it may be expedient to not perform said establishing and always execute step V5. However, step U2b of FIG. 12 is generally an optional step.

For example, step V5 can be repeated for transmission to a plurality of further eNodeBs (not shown in FIG. 13), e.g., all eNodeBs to which the first eNodeB 10a has a connection via the X2 interface, so-called peer eNodeBs. In such embodiments, the peer eNodeBs are aware of the at least one protected time-slot 30 and can take this into account in their scheduling decisions, although they did not receive the handover request and a request for the at least one protected time-slot 30 before. It is not necessary that the peer eNodeBs respond to the indication of the at least one protected time-slot 30 of step V5.

The preceding FIGs. have been discussed mainly with respect to the single UE 11. In various embodiments, the techniques are extended to support transmission of control messages 60 to and from multiple UEs 11 connected to the first eNodeB 10a. The first eNodeB 10a, over a certain period of time, pools or collects a number of measurement reports (cf. FIG. 6: step S2) from a plurality of UEs and then indicates the need for the at least one protected time-slot 30. Alternatively or additionally, the second eNodeB 10b, over a certain period of time, pools a number of Handover Request messages (cf. FIG. 6: step S3) before sending the second message 101 to the first eNodeB 10a. In general, the first eNodeB 10a can schedule any number of control messages 60 for at least one UE 11 to be transmitted in the at least one protected time-slot 30. Such embodiments may be particularly useful where there is a need for the transmitting of the control message 60 to multiple UEs 11, e.g., UEs 11 transported in the same vehicle.

Figure 14:
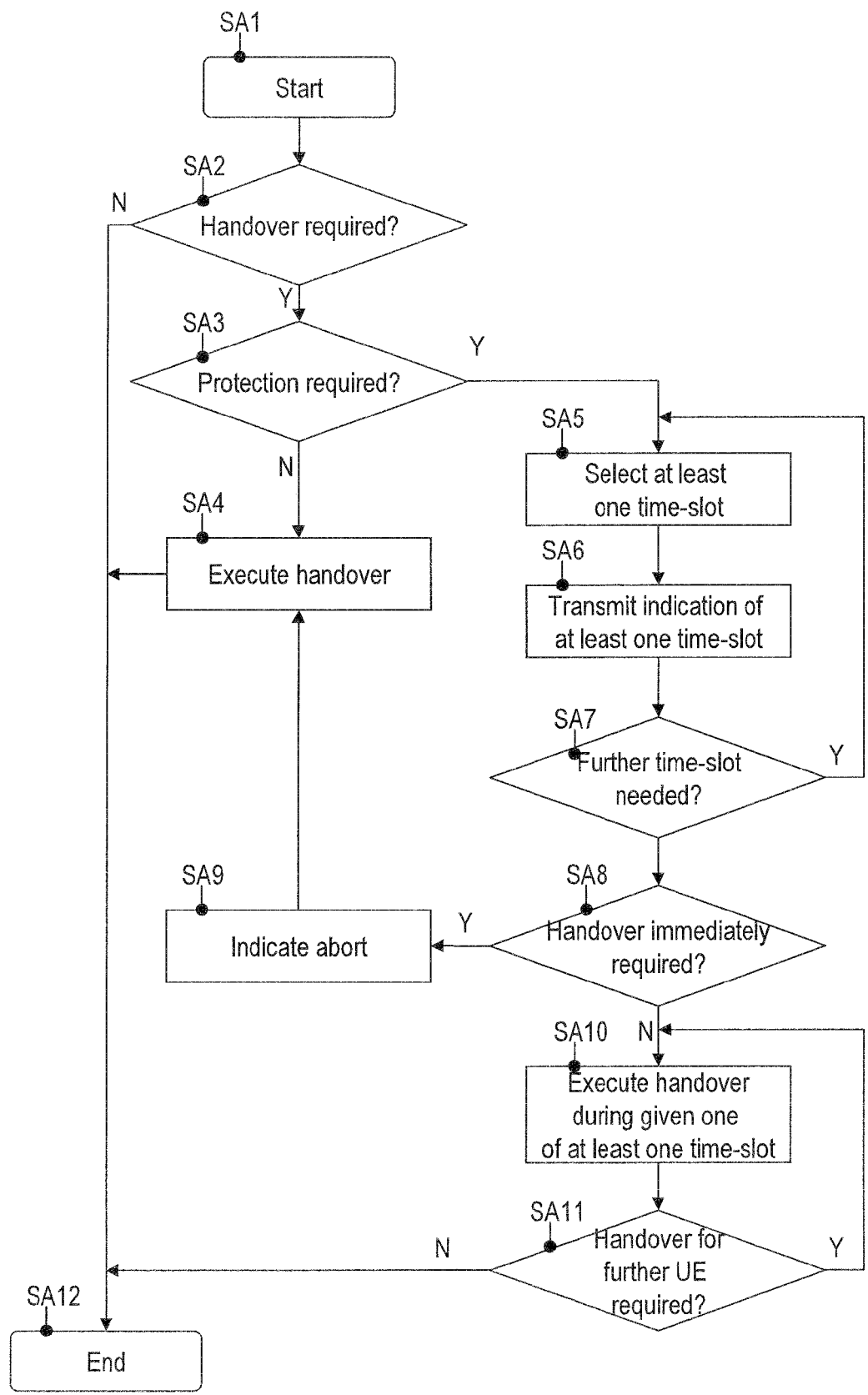
FIG. 14 is a flowchart of a method of transmitting a control message according to various embodiments of the invention where the control message is a handover command.

In FIG. 14, a flowchart of a method of transmitting a control message according to various embodiments of the invention is depicted. The method starts in step SA1. In step SA2, the first eNodeB 10a determines whether a handover is required, i.e., the need for transmitting the Handover Command message as the control message 60 is determined. This can include, e.g., the receipt of a Measurement Report message, cf. FIG. 6: step S2. If no handover is required, the method ends in step SA12.

In step SA3, it is established whether protection is required for the Handover Command message, i.e., whether there is a need for the at least one protected time-slot 30. Said establishing can be based on a number of parameters, e.g., signal levels of the participating eNodeBs 10a, 10b, 10c measured at the UE 11, transmit powers of the participating eNodeBs 10a, 10b, 10c, a CQI, etc. If there is no need for protection of the Handover Command message 60, the handover can be executed with no particular scheduling imposed in step SA4. Step SA4 may include the steps S3 ff. of FIG. 6.

Otherwise, if there is a need for protection, in step SA5, the at least one protected time-slot 30 is selected in the first eNodeB 10a from a plurality of candidate time-slots. Said selecting may be based on the urgency of the handover, a count of pending handovers, a velocity of the UE 11, preconfigured rules, and/or a data traffic load of the eNodeBs 10a, 10b etc. The candidate time-slots may be time-slots as defined by an ICIC pattern and/or all upcoming time-slots and/or all upcoming timeslots after an offset delay.

Then, in step SA6, the indication of the at least one protected time-slot 30 is transmitted. In various embodiments, step SA6 includes sending the first message 101 from the first eNodeB 10a to the second eNodeB 10b including the indicators 105 indicating the at least one time-slot 30, either implicitly or explicitly, cf. FIGS. 9A-9F.

It should be noted that it is also possible to execute step SA5 after step SA6, e.g., if the selecting of the at least one protected time-slot 30 is executed in the second eNodeB 10b. Then, also the indicating of step SA6 may comprise different information and/or messages. For example, in such an embodiment, the indicating in step SA6 may comprise the second message 101 from the second eNodeB 10b to the first eNodeB 10a including the indicators 105 indicating the at least one time-slot 30, either implicitly or explicitly.

Figure 15:
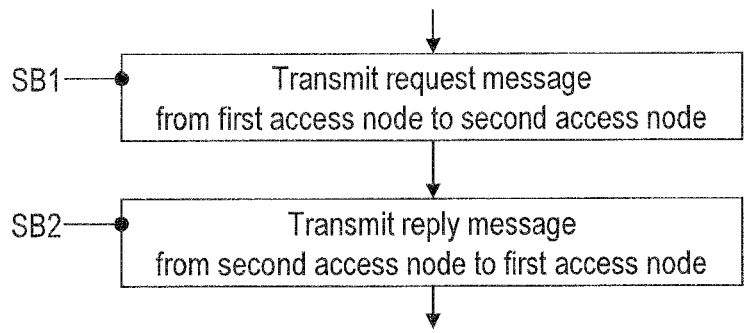
FIG. 15 is a flowchart illustrating steps of FIG. 14 in further detail.

It is also possible that the selecting of step SA5 is part of a negotiation between the first and second eNodeBs 10a, 10b, i.e., conducted in, both, eNodeBs 10a, 10b. In this respect, the steps SA5 and SA6 do not need to be separated steps, but rather may be combined in a single procedure. In particular in such an embodiment, step SA6 may comprise the sending of the first and second messages 101, 102 as request and reply messages; this is illustrated in the flowchart of FIG. 15. In step SB1, the first message 100 is transmitted from the first eNodeB 10a to the second eNodeB 10b. In step SB2, the second message 101 is transmitted from the second eNodeB 10b to the first eNodeB 10a.

Turing again to FIG. 14, if further protected time-slots 30 are needed (step SA7), the steps SA5 and SA6 are executed anew. For example, it may be expedient to transmit the Handover Command message not only once, but two, three or four times, or more often. This may decrease the likelihood of transmission failure further. To this respect, it may be expedient to select and determine a plurality of protected time-slots 30 in steps SA5-SA7.

Once the at least one protected time-slot 30 is determined and, both, eNodeBs 10a, 10b are informed respectively, the first eNodeB 10a schedules transmission of the Handover Command message for the at least one protected time-slot 30. This means that transmission of the Handover Command occurs in at least some of the at least one protected time-slot 30.

However, if in the meantime the handover is immediately required (step SA8), this may be signalled to the second eNodeB 10b (step SA9) and the handover executed at once (step SA4). Likewise, if the handover is not required at all anymore, the procedure may be stopped. Such steps can be executed as part of the conditional loop of FIG. 14 or, in various embodiments, on-demand at any time.

Otherwise, the handover is executed during at least some of the at least one protected time-slot 30 (step SA10). In other words: the first access node 10a transmits the control message 60 in the at least one protected time-slot 30. This means that transmission of the Handover Command occurs during at least some of the at least one protected time-slot 30.

If there are multiple queued handovers pending (step SA11), they may be grouped and the respective Handover commands may all be transmitted in the at least one protected time-slot 30.

Otherwise, the method may end at step SA12.

Figure 16:
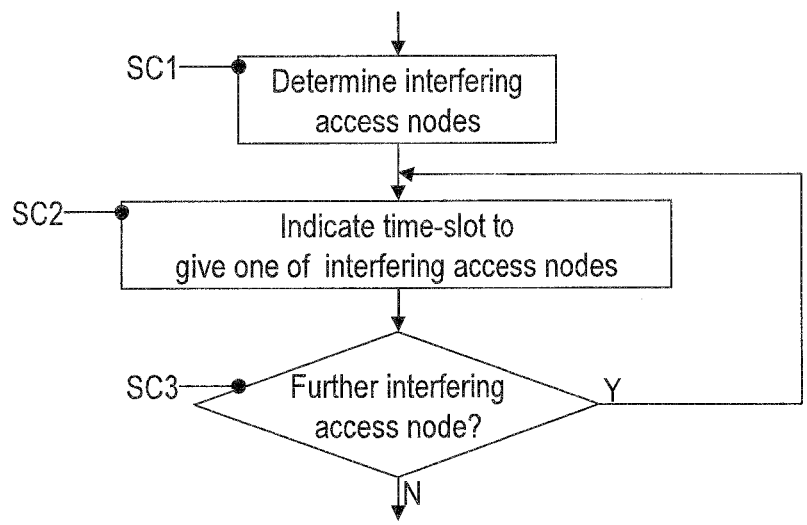
FIG. 16 is a flowchart illustrating steps of FIG. 14 in further detail.

It is possible to inform further eNodeBs, e.g., peer eNodeBs and/or interfering eNodeBs, of the at least one protected time-slot 30 before step SA8. This is illustrated in the flowchart of FIG. 16. For this, in step SC1 the interfering access nodes are determined (if necessary). In steps SC2 and SC3, the at least one protected time-slot 30 is indicated to these eNodeBs. This may occur, e.g., via the signalling as discussed with respect to FIG. 13.

Concluding, it has been shown that according to various embodiments means are provided to protect—on demand—the transmission of the control message against spectral interference. In particular, various embodiments allow to improve the handover performance within an 3GPP standardized LTE mobile communications network, e.g., including a HetNet deployment. Especially the transmission of the Handover Command message from the source eNodeB to a UE is improved by protecting it from spectral interference from one or more interfering eNodeBs. In various embodiments, this is achieved by muting the one or more interfering eNodeBs in certain subframes on demand. In this respect, the ABS and/or MBSFN functionality can be reused for the muting. RBS radio frames can be alternatively or additionally employed. E.g., in case the target eNodeB of the handover is also an interfering eNodeB, the demand for the muting can be included in standardized handover preparation messages between source and target eNodeBs.

The on-demand basis of the protection of the control message 60 allows for low performance restrictions when executing such techniques, both, at the source eNodeB, as well as in the interfering eNodeBs.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, the control message 60 has been mainly discussed with respect to the Handover Command message, cf. FIG. 6, step S2. Yet, various other control messages 60 may be subject to various embodiments of the present invention. Examples include, but are not limited to: the Measurement report (cf. FIG. 6, step S2); or a further CQI message; a downlink control message transmitted from the first access node 10a to the UE 11, the downlink control message comprising a grant to the UE 11 for transmission on an uplink; a downlink control message transmitted from the first access node 10a to the UE 11, the downlink control message comprising a command for configuration of a connectivity of the UE to access nodes and/or carriers; an uplink control message transmitted from the UE 11 to the first access node 10a. For this, alternatively or additionally, the indication of the at least one protected time-slot 30 may be transmitted between the UE 11 and the first access node 10a, e.g., in an uplink message from the UE 11 to the first access node 10a preceding the control message 60.

Furthermore, while embodiments have been mainly discussed with respect to the 3GPP LTE standard, it is possible to employ the respective techniques for mobile communications networks based on other standard.

The invention claimed is:

1. A method of protecting transmission of a control message, in a mobile communications network, between a first access node and a user equipment, the method comprising:
   in response to a need for transmitting the control message, transmitting, between the first access node and a second access node, an indication of at least one protected time-slot for transmitting the control message; the transmitting of the indication prompting reduction of spectral interference caused by the second access node during the at least one protected time-slot;
   wherein the transmitting of the indication of the at least one protected time-slot is part of negotiating of the at least one protected time-slot between the first access node and the second access node, the negotiating including:
      sending, from the first access node to the second access node, a request message indicating a plurality of candidate time-slots from which the at least one protected time-slot is selected; and
      receiving, from the second access node, an acknowledgement message positively and/or negatively acknowledging candidate time-slots from which the at least one protected time-slot is selected.

2. The method of claim 1:
   wherein the control message is a handover command commanding the user equipment to execute a handover from the first access node to a different access node;
   further comprising transmitting the handover command from the first access node to the user equipment.

3. The method of claim 2, wherein the different access node is the second access node.

4. The method of claim 1, wherein the indication of the at least one protected time-slot is transmitted as part of a handover request message.

5. The method of claim 1, wherein the indication of the at least one protected time-slot is transmitted as part of a handover request reply message.

6. The method of claim 1, further comprising the first access node transmitting the control message in the at least one protected time-slot.

7. The method of claim 1, further comprising the second access node reducing an emitted spectral power in the least one protected time-slot to reduce the spectral interference with the first access node.

8. The method of claim 7, wherein the reducing of the emitted spectral power comprises at least one of:
   limiting a transmit power of the second access node to a predefined value;
   at least partly interrupting the transmission of control data and/or payload data;

at least partly interrupting the transmission of control data and/or payload data on at least one frequency band of the spectrum.

9. The method of claim 1, further comprising the first access node and/or the second access node selecting the at least one protected time-slot from the plurality of candidate time-slots.

10. The method of claim 9, wherein the selecting is based on at least one of:
an urgency of the transmitting of the control message, wherein the urgency is a measure of the desired delay until the transmitting of the control message;
a velocity of the user equipment;
a data traffic load of the first access node and/or the second access node;
a count of pending handovers;
preconfigured rules.

11. The method of claim 1, wherein the at least one protected time-slot is defined with respect to at least one radio frame of a sequence of radio frames used for data communication over a radio interface in the mobile communications network.

12. The method of claim 11, wherein the indication explicitly indicates the at least one radio frame by means of at least one sequence number and/or the indication implicitly indicates the at least one radio frame by means of a pre-defined rule.

13. The method of claim 1, further comprising the first access node and/or the user equipment determining the need for transmitting the control message.

14. The method of claim 13, wherein the determining of the need for transmitting the control message is based on at least one of:
a signal level of the first access node measured at the user equipment;
a signal level of the second access node measured at the user equipment;
a transmit power of the first access node;
a transmit power of the second access node;
a signal level of the at least one further access node measured at the user equipment;
a transmit power of the at least one further access node;
a channel quality report;
history information on previously transmitted control messages;
a handover need;
a count of pending handover needs;
a velocity of the user equipment;
preconfigured rules.

15. The method of claim 1, further comprising:
in response to the need for transmitting the control message, determining whether the at least one protected time-slot is required;
wherein the transmitting of the indication is selectively executed based on the determination of whether the at least one protected time-slot is required.

16. The method of claim 1, wherein the control message is at least one of:
a handover message transmitted from the first access node to the user equipment, the handover message commanding the user equipment to execute a handover from the first access node to a further access node;
a downlink control message transmitted from the first access node to the user equipment, the downlink control message comprising a grant to the user equipment for transmission on an uplink;
a downlink control message transmitted from the first access node to the user equipment, the downlink control message comprising a command for configuration of a connectivity of the user equipment to access nodes and/or carriers;
an uplink control message transmitted from the user equipment to the first access node;
a channel quality report transmitted from the user equipment to the first access node.

17. An access node of a mobile communications network, the access node comprising:
a first interface for communicating with a further access node;
a second interface for communicating with a user equipment connected to the access node;
a processing circuit configured to:
control, in response to a need for transmitting a control message between the access node and the user equipment, transmission, to the further access node, of an indication of at least one protected time-slot for transmitting the control message; the transmitting of the indication prompting reduction of spectral interference caused by the further access node during the protected time-slot;
control transmission of the control message to take place in the at least one protected time-slot;
negotiate the at least one protected time-slot with the further access node, the negotiating including:
controlling the transmission of the indication;
sending a request message to the further access node, the request message indicating a plurality of candidate time-slots from which the at least one protected time-slot is selected;
receiving, from the further access node, an acknowledgement message positively and/or negatively acknowledging candidate time-slots from which the at least one protected time-slot is selected.

18. The access node of claim 17, wherein the processing circuit is further configured to determine the need for transmitting the control message.

19. The access node of claim 17, wherein the processing circuit is further configured to:
determine, in response to the need for transmitting the control message, whether the protected time-slot is required;
selectively execute the transmitting of the indication based on the determination of whether the protected time-slot is required.

20. A method of protecting transmission of a control message, in a mobile communications network, between a first access node and a user equipment, the method comprising:
in response to a need for transmitting the control message, transmitting, between the first access node and a second access node, an indication of at least one protected time-slot for transmitting the control message; the transmitting of the indication prompting reduction of spectral interference caused by the second access node during the at least one protected time-slot;
wherein the transmitting of the indication of the at least one protected time-slot is part of negotiating of the at least one protected time-slot between the first access node and the second access node, the negotiating including:
the second access node receiving, from the first access node, a request message indicating a plurality of candidate time-slots from which the at least one protected time-slot is selected; and the second access node sending an acknowledgement message to the first access node, the acknowledgement message positively and/or negatively acknowledging candidate time-slots from which the at least one protected time-slot is selected.

21. An access node of a mobile communications network, comprising:

a first interface for communicating with a further access node;

a second interface for connecting via a radio interface to one or more user equipment connected to the access node;

a processing circuit configured to:

control, in response to a need for transmitting a control message between the further access node and a user equipment connected to the further access node, transmission to the further access node of an indication of at least one protected time-slot for transmitting the control message, the transmitting of the indication prompting reduction of a spectral interference caused by the access node during the protected time-slot;

control an emitted spectral power on the radio interface during the least one protected time-slot to reduce the spectral interference with the further access node;

negotiate the at least one protected time-slot with the further access node, the negotiating including:

controlling the transmission of the indication, receiving a request message from the further access node, the request message indicating a plurality of candidate time-slots from which the at least one protected time-slot is selected;

sending an acknowledgement message to the further access node, the acknowledgement message positively and/or negatively acknowledging candidate time-slots from which the at least one protected time-slot is selected.

22. A computer program product stored in a non-transitory computer readable medium for protecting transmission of a control message, in a mobile communications network, between a first access node and a user equipment, the computer program product comprising software instructions which, when run on a processing circuit of the first access node, causes the first access node to:

in response to a need for transmitting the control message, transmit, between the first access node and a second access node, an indication of at least one protected time-slot for transmitting the control message; the transmitting of the indication prompting reduction of spectral interference caused by the second access node during the at least one protected time-slot;

wherein the transmitting of the indication of the at least one protected time-slot is part of negotiating of the at least one protected time-slot between the first access node and the second access node, the negotiating including:

sending, from the first access node to the second access node, a request message indicating a plurality of candidate time-slots from which the at least one protected time-slot is selected; and receiving, from the second access node, an acknowledgement message positively and/or negatively acknowledging candidate time-slots from which the at least one protected time-slot is selected.

23. A computer program product stored in a non-transitory computer readable medium for protecting transmission of a control message, in a mobile communications network, between a first access node and a user equipment, the computer program product comprising software instructions which, when run on a processing circuit of a second access node, causes the second access node to:

in response to a need for transmitting the control message, transmit, between the first access node and a second access node, an indication of at least one protected time-slot for transmitting the control message; the transmitting of the indication prompting reduction of spectral interference caused by the second access node during the at least one protected time-slot;

wherein the transmitting of the indication of the at least one protected time-slot is part of negotiating of the at least one protected time-slot between the first access node and the second access node, the negotiating including:

the second access node receiving, from the first access node, a request message indicating a plurality of candidate time-slots from which the at least one protected time-slot is selected; and the second access node sending an acknowledgement message to the first access node, the acknowledgement message positively and/or negatively acknowledging candidate time-slots from which the at least one protected time-slot is selected.

* * * * *